United States Patent [19]
Cargnel et al.

[11] Patent Number: 5,824,227
[45] Date of Patent: Oct. 20, 1998

[54] METHOD FOR REMOVING FLUORIDE FROM WATER

[75] Inventors: Daniel A. Cargnel, New Freedom; Mark K. Crescenzi, Dillsburg, both of Pa.

[73] Assignee: WMX Technologies, Inc., Oak Brook, Ill.

[21] Appl. No.: 820,589

[22] Filed: Mar. 19, 1997

[51] Int. Cl.⁶ .................................................. C02F 1/58
[52] U.S. Cl. ........................ 210/713; 210/915; 423/126; 423/495
[58] Field of Search .................................. 210/713, 723, 210/726, 915; 423/122, 126, 489, 495

[56] References Cited

U.S. PATENT DOCUMENTS

| | | | |
|---|---|---|---|
| 2,210,966 | 8/1940 | Urbain et al. | 210/915 |
| 2,268,971 | 1/1942 | Urbain et al. | 210/915 |
| 3,926,753 | 12/1975 | Lee | 210/915 |
| 3,959,132 | 5/1976 | Singh | 210/45 |
| 4,028,237 | 6/1977 | Nishimura et al. | 210/45 |
| 4,159,246 | 6/1979 | Matsumoto | 210/47 |
| 4,657,680 | 4/1987 | Zibrida | 210/915 |
| 5,043,072 | 8/1991 | Hitotsuyanagi et al. | 210/638 |
| 5,403,495 | 4/1995 | Kust et al. | 210/710 |
| 5,531,903 | 7/1996 | Hampton et al. | 210/915 |

FOREIGN PATENT DOCUMENTS

| | | |
|---|---|---|
| 4932472 | 7/1972 | Japan . |
| 90159 | 2/1975 | Japan ..................................... 210/915 |
| 5367958 | 6/1979 | Japan . |

*Primary Examiner*—Neil McCarthy
*Attorney, Agent, or Firm*—McDonnell Boehnen Hulbert & Berghoff

[57] ABSTRACT

A process for removing dissolved fluorides from an aqueous stream using at least two reactors wherein the dissolved fluoride containing aqueous feed and an unreacted aluminum containing sludge are combined in the first reactor to give a first reactor admixture after which the first reactor effluent stream is directed to the second reactor and therein combined with fresh alum and fresh sodium aluminate to give a second reactor admixture comprising a reduced fluoride aqueous solution and a partially reacted aluminum containing sludge and thereafter recovering the reduced fluoride aqueous solution and recycling at least a portion of the aluminum containing sludge to the first reactor.

14 Claims, 2 Drawing Sheets

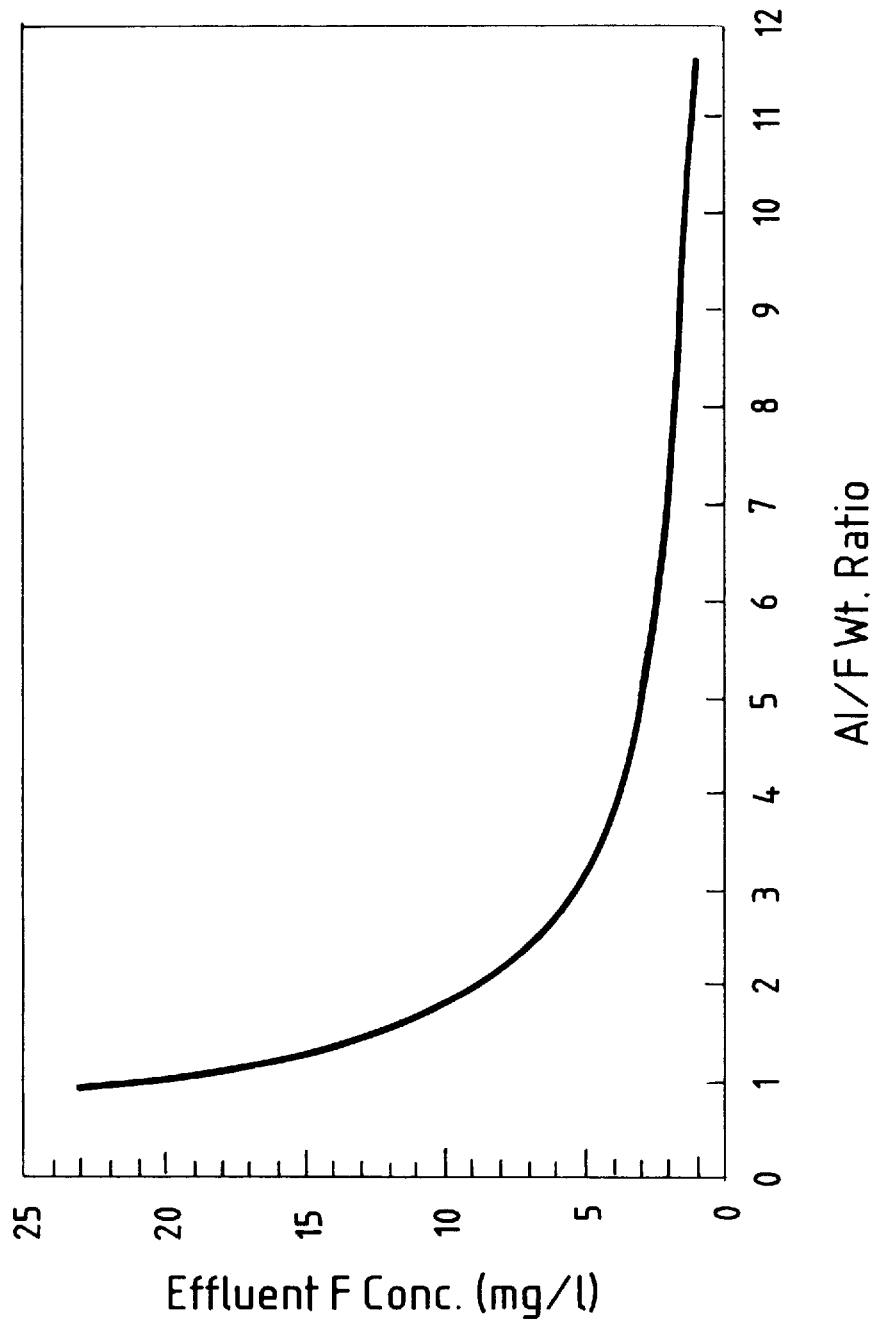

5,824,227

METHOD FOR REMOVING FLUORIDE FROM WATER

BACKGROUND OF THE INVENTION (1) Field of the Invention

This invention concerns a method and process for removing fluoride from water using two aluminum based compounds. More particularly, this invention concerns a method for removing fluoride from wastewater and groundwater using a mixture of alum and sodium aluminate ($NA_2Al_4$) in a two reactor process wherein sludge containing unreacted alum and sodium aluminate is recycled from the second reactor back to the first reactor with the net result of reducing chemical consumption and sludge production by up to 60%.

(2) Description of the Art

Processes for removing fluoride from aqueous fluoride containing streams using aluminum and aluminum containing compounds are known in the art. The processes all remove fluoride from the aqueous streams by allowing aluminum ions to react with fluoride ions to produce insoluble aluminum fluorides that can then be removed from the aqueous steam as a floc or by using standard solid/liquid separation techniques. For example, U.S. Pat. No. 4,159,246 discloses two different processes for removing fluoride from water. The first process uses an aluminum anode and copper cathode to produce aluminum ions that react with the fluorine. In the second process, aluminum ions are generated by the addition of a sulfate, aluminum chloride, or sodium aluminate to the aqueous stream.

Another fluoride removal process is disclosed in U.S. Pat. No. 5,043,072 which describes a process for treating fluoride containing water with a calcium or aluminum compound. The treated water is subjected to a membrane separation step and the resulting concentrate is combined with the incoming fluoride containing water.

U.S. Pat. No. 5,403,495 discloses a process for removing dissolved fluoride from a waste water stream. The process includes contacting the waste water with a calcium ion source. The process occurs in two treatment stages and includes the recycle of an enhanced precipitate from the second reaction stage to the first reaction stage. The sole purpose of the two-stage reaction is to improve sludge characteristics.

U.S. Pat. No. 3,959,132 discloses a process for removing fluoroborates from an aqueous stream. The fluoroborates are removed from the solution by adding aluminum to the solution in the form of aluminum chloride, aluminum sulfate, alum, or elemental aluminum and thereafter liberating the fluoride from the resulting precipitate and reacting the fluoride with calcium ions.

Finally, U.S. Pat. No. 4,028,237 discloses a method and apparatus for treating fluoride containing waste water with aluminum ions. In the process, the fluoride is reacted with aluminum ions to produce hydroxyfluoride complexes. Any unreacted fluoride is converted into fluoride apatite by adding phosphoric acid or phosphoric acid/calcium compound to the mixture.

The prior art processes are able to remove fluoride from aqueous streams only by using large amounts of expensive chemical additives. Therefore, there remains a need for aqueous fluoride removal processes that use small amounts of chemical additives to remove fluoride from aqueous solutions and that produce small amounts of sludge and other by-products. There is also a need for a process that adds only small amounts of total dissolved solids to the process effluent stream.

SUMMARY OF THE INVENTION

It is an object of this invention to provide a process for removing fluoride from a fluoride contaminated groundwater or wastewater that produces an essentially fluoride free water product.

It is another object of this invention to provide a process for removing fluoride from a fluoride contaminated groundwater or wastewater that is cheaper to operate than conventional fluoride removal processes due to significantly lower chemical costs.

It is still another object of this invention to provide a process for removing fluoride from a fluoride contaminated groundwater or wastewater that generates significantly smaller amounts of sludge than conventional fluoride removal processes.

It is yet another object of this invention to provide a process that contributes significantly less total dissolved solids to the effluent treated stream than conventional fluoride removal processes.

In one embodiment, this invention is a process for removing fluoride from a fluoride containing aqueous stream comprising the steps of contacting a fluoride containing aqueous feed stream with alum and/or sodium aluminate in a first reactor for a period of time sufficient to allow at least a portion of fluoride to react with the alum and sodium aluminate to give an aqueous first reactor effluent stream having a fluoride concentration less than the fluoride concentration of the aqueous feed stream. The first reactor effluent stream is directed into a second reactor to give a second reactor aqueous feed. Alum and sodium aluminate are then combined with the second reactor aqueous feed in the second reactor to give a second reactor admixture. The second reactor admixture is allowed to reside in the second reactor for a period of time sufficient to give an aqueous product stream having a fluoride concentration less than the fluoride concentration of the first reactor effluent stream.

Another aspect of this invention is a continuous process for removing fluoride from a fluoride containing aqueous feed. In the process, a fluoride containing aqueous feed stream is admixed with a sludge recycle stream comprising unreacted alum and unreacted sodium aluminate in a first reactor to give a first reactor admixture. The first reactor admixture is allowed to reside in the first reactor for a period of time sufficient to allow at least a portion of fluoride to react with the unreacted alum and sodium aluminate to give an aqueous first reactor effluent stream having a fluoride concentration less than the fluoride concentration of the aqueous feed stream. The first reactor effluent stream is clarified in a clarifier to give a first clarified effluent stream and a sludge product stream. The clarified effluent stream is directed into a second reactor where it is admixed with fresh alum and fresh sodium aluminate to give a second reactor admixture. The second reactor admixture is allowed to reside in the second reactor for a period of time sufficient to give a second reactor effluent stream that has a fluoride concentration less than the fluoride concentration of the first reactor effluent stream. The second reactor effluent is then clarified in a clarifier to give a clarified aqueous product stream and a sludge recycle stream, and at least a portion of the sludge recycle stream is then recycled to the first reactor.

DESCRIPTION OF THE FIGURES

FIG. 2 is a plot of the aluminum dosage requirements as they relate to the removal of fluorides from a fluoride containing aqueous stream where the Y-axis represents the desired product effluent fluoride concentration, and the X-axis represents the ratio of aluminum to fluoride (AL/F) in the reaction solution to achieve the desired effluent stream fluoride content.

DESCRIPTION OF THE CURRENT EMBODIMENT

Figure 1:
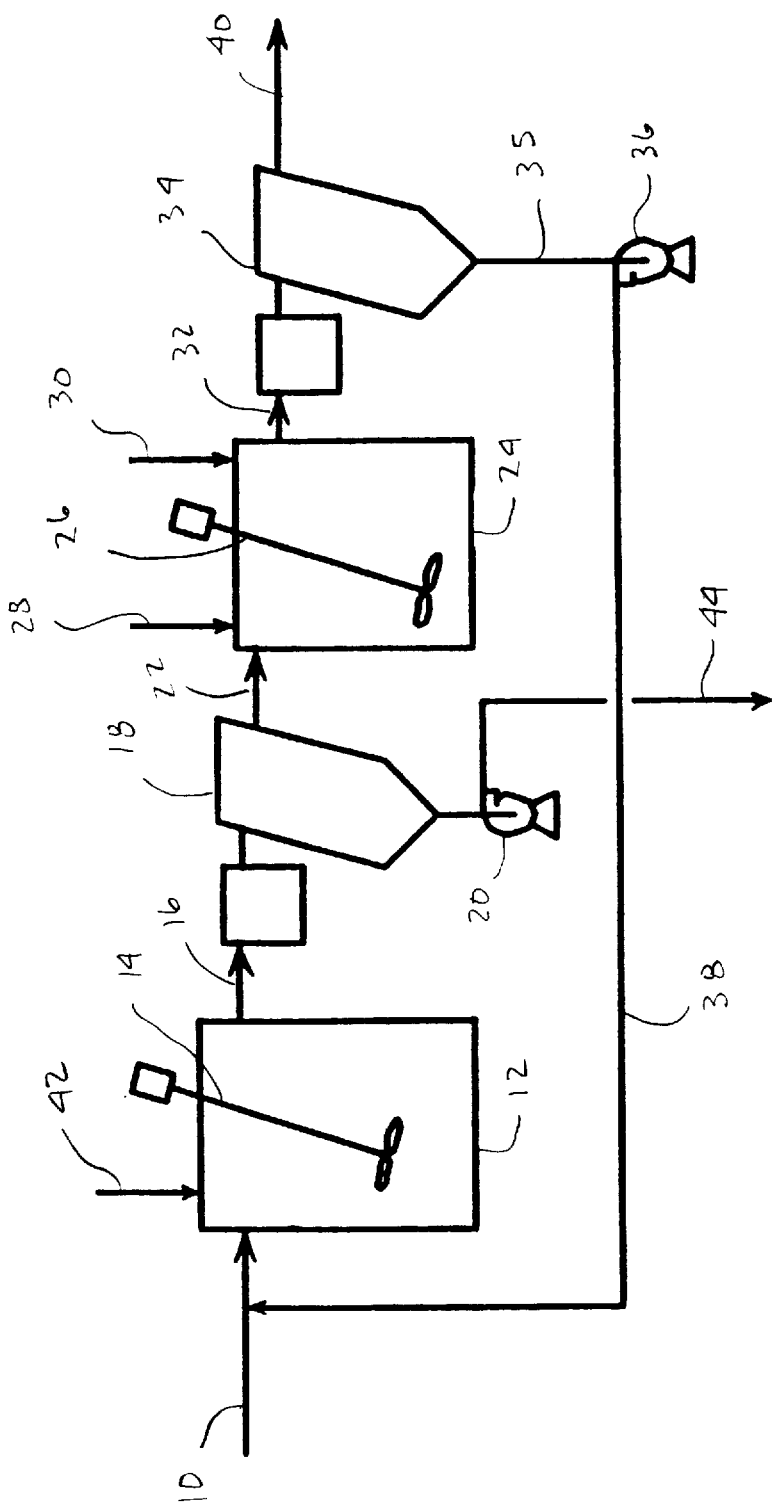
FIG. 1 is a process flow diagram for a two stage process of this invention for removing fluoride from a fluoride containing aqueous stream such as wastewater or groundwater.

The present invention relates to a process for removing fluoride from fluoride contaminated wastewater and ground water. The process requires much less aluminum containing compounds to achieve the desired fluoride removal than conventional fluoride removal processes while producing an essentially fluoride free aqueous product stream.

The process of this invention is capable of reducing the fluoride content of the fluoride containing feed stream down to about 1.0 ppm or lower. It is generally understood that water having a fluoride content in excess of 0.5 ppm can damage tooth enamel and that it is no longer fit for drinking at levels above 0.8 ppm. However, river water is generally considered to be safe with fluoride levels up to 2 ppm and sewage may contain up to about 10 ppm fluorides. Therefore, it is preferred that the process of this invention reduce the fluoride content of the fluoride containing aqueous feed to below 10 ppm. At this level and for purposes of this invention, the aqueous fluoride containing feed stream will be considered "essentially fluoride-free". It is most preferred that the method of this invention reduce the fluoride level of an aqueous stream to less than about 1 ppm.

FIG. 1 is a schematic view of a preferred process of this invention. The preferred process of this invention will include at least two reactors; a first reactor 12 and a second reactor 24. A feed stream 10 comprising an aqueous fluoride containing solution is directed to first reactor 12. The aqueous fluoride containing feed stream will generally include from about 20 to about 100 ppm or more fluoride.

In first reactor 12, the fluoride containing aqueous feed is combined with a sludge comprising unreacted alum, unreacted sodium aluminate and precipitated aluminum fluoride from sludge recycle stream 38 to give a first reactor admixture. The contents of first reactor are agitated with a first mixer 14 in order to facilitate the reaction between the unreacted alum and the unreacted sodium aluminate and fluoride compounds in aqueous feed stream 10. Any method of agitating the contents of an aqueous reactor may be used in association with first reactor 12 and second reactor 24. Non-exclusive examples of agitation methods include mixing, sparging, and agitation.

The first reactor admixture resides in first reactor 12 for a period of time sufficient to reduce the fluoride content of first reactor effluent stream 16 to the desired level. In order to minimize the amount of sludge produced by the process and in order to minimize the amount of alum and sodium aluminate added to the fluoride removal process of this invention, it is preferred that the first reactor effluent stream have a fluoride content of from about 2 mg/L to about 20 mg/L. According to FIG. 2, this corresponds to an aluminum weight dosage requirement in first reactor 12 of from about 1 to about 9 parts of aluminum per part of fluoride in first reactor 12.

It is preferred that first reactor effluent stream 16 have a fluoride content of from about 5 mg/L to about 15 mg/L which corresponds to a first reactor 12 aluminum weight dosage requirement of from about 1.25 to about 3.25 parts of aluminum per part of fluoride.

First reactor effluent stream 16 is directed into first clarifier 18. In first clarifier 18, sludge recycled from second reactor 24 and sludge produced by the reaction of aluminum with fluoride in first reactor 12 is separated from the fluoride containing aqueous effluent to give a first clarifier effluent stream 22 and a sludge effluent 44. Sludge pump 20, which is associated with first clarifier 18 by a conduit, is used to remove sludge from first clarifier 18. However, sludge may be removed from first clarifier 18 by any method or apparatus known to one skilled in the art for removing sludge from a clarifier.

First clarifier effluent 22 is directed into second reactor 24. Fresh alum feed 28 and fresh sodium aluminate feed 30 are added to second reactor 24 in order to facilitate the conversion of fluorides in second clarifier effluent 22 into insoluble aluminum fluorides. The contents of second reactor 24 comprising first clarifier effluent 22, alum, and sodium aluminate are admixed by agitation to give a second reactor admixture. The method used to agitate the second reactor admixture are the same as described above for agitating the first reactor admixture with a second mechanical mixer 26 being preferred.

Enough alum and sodium aluminate must be added to second reactor 24 to reduce the level of fluoride in treated aqueous effluent stream 40 to a range of from about 0.1 to about 10 mg/L, and preferably from about 1 to about 5 mg/L. According to FIG. 2, in order to achieve this level of fluoride reduction in second reactor 24, the aluminum to fluoride weight ratio [Al/F] in second reactor 24 must range from about 12 or more to about 1.75 and preferably from about 3.0 to about 10.0.

"Alum" and sodium aluminate ($Na_2Al_2O_4$) are jointly used as sources of Al and are applied in carefully administered dosages. Sodium aluminate is a basic material and is used to neutralize the "alum" so that no additional chemicals are required for pH adjustment. Sodium aluminate is also a less expensive source of aluminum ions than alum. In addition, sodium aluminate produces a more dense sludge than does "alum", which improves clarification and dewatering performance. Alum and sodium aluminate should be combined in second reactor 24 in amounts sufficient to achieve the desired Al/F weight ratio and in amounts sufficient to give a second reactor pH of from about 5.5 to about 7.5.

A second reactor effluent stream 32 is withdrawn from second reactor 24 and directed into second clarifier 34. In second clarifier, second reactor effluent stream 32 is clarified to give a treated aqueous effluent 40 and a second clarifier sludge effluent 35. Second clarifier sludge effluent is directed to the inlet of sludge recycle pump 36 and pumped as sludge recycle stream 38 into first reactor.

Sludge recycle stream 38 includes unreacted alum, unreacted sodium aluminate and insoluble aluminum fluoride sludge. Generally, sludge recycle stream 38 will include sufficient unreacted aluminum to react with fluoride in the first reactor admixture to attain the desired fluoride levels in first reactor effluent stream 16. If, however, there is insufficient unrelated aluminum in sludge recycle stream 38 to produce a first reactor effluent with the desired fluoride levels, or if the pH of the mixture in first reactor 12 is above or below the target levels, then additional fresh alum and/or sodium aluminate can be added to first reactor 12 via secondary feed source 42.

With the preferred two-stage process, the fluoride content of the first reactor admixture is greater than the fluoride content of the second reactor admixture. As a result, the adsorption capacity of the Al in the first stage is approximately three times greater than the adsorption capacity of the Al in the second stage. Recycling the sludge from the second reactor to the first reactor allows for the recovery of about two-thirds of the Al applied in the second stage as unreacted aluminum.

The process of this invention may be operated as a batch process or as a continuous process with continuous process operations being preferred.

Based upon the description of the invention above, it is apparent that numerous modifications and variations can be made to the method without departing from the true spirit and scope of the novel concepts of the present invention. It is to be understood that no limitations with respect to the specific embodiments illustrated is intended or should be inferred. The disclosure is intended to cover any and all invention modifications as fall within the scope of the claims.

EXAMPLE 1

This Example demonstrates the expected efficiency of a single stage process of the prior art for removing fluoride from an aqueous stream. Referring to FIG. 2 and assuming an influent fluoride concentration of 50 mg/L and a required effluent concentration of 2 mg/L, then the single stage conventional process would require an Al to F weight ratio of 7/1 or 350 mg/L of Al would be required to produce an effluent stream with the desired fluoride level.

EXAMPLE 2

This Example demonstrates the ability of a two-stage process of this invention without sludge recycle to reduce the a 50 mg/L fluoride containing aqueous fees stream to 2 mg/L.

In a two-stage process, fluoride would be reduced to 8 mg/L in the first stage requiring a 2/1 ratio of Al to F, or 100 mg/L of Al to achieve a first stage fluoride reduction to 8 mg/L. In the second stage, a 7/1 ratio would be applied to bring the starting concentration of fluoride from 8 mg/L to 2 mg/L. The second stage Al requirements would be 56 mg/L, for a total Al consumption of 156 mg/L in the two-stage process—less than one-half of the chemical requirements of the conventional process described in Example 1.

EXAMPLE 3

This example details the benefits of operating the process described above in Example 2 with sludge recycle. An Al to F ratio of about 1.5/1 would be necessary in the first stage to reduce the fluoride content of the incoming aqueous stream from 50 mg/L to about 13 mg/L. The first stage Al requirement would, therefore, be about 75 mg/L. The effluent from the first stage would contain about 13 mg/L of F. A 7/1 aluminum to fluoride weight ratio would be required in the second stage to reduce the fluoride content of the feed stream to 2 mg/L. This corresponds to a Al dosage in the second reactor of about 90 mg/L. When the second stage sludge is recycled to the first stage, about 60 mg/L of Al would be recovered, and recycled. Only 15 mg/L of raw Al would be applied directly to the first stage. The total Al consumption of the process using sludge recycle is about 105 mg/L—30% of the chemical requirements of the conventional process.

Actual bench scale data is presented below for a 1.0 liter sample:

| | |
|---|---|
| Raw Wastewater Fluoride Concentration | 52.2 mg/l |
| Chemicals Added in Stage 1 | 0.6 mls alum or 35 mg/l aluminum plus 95 mls sludge from Stage 2 |
| Stage 1 Effluent Fluoride Concentration | 14.7 mg/l |
| Chemicals Added in Stage 2 | 0.6 mls alum plus 0.18 mls $Na_2Al_2O_4$ or 72 mg/l aluminum |
| Stage 2 Effluent Fluoride Concentration | 2.8 mg/l |

What I claim is:

1. A process for removing fluoride from a fluoride containing aqueous feed stream comprising the steps:
   a. contacting the fluoride containing aqueous feed stream with alum and sodium aluminate in a first reactor for a period of time sufficient to allow at least a portion of fluoride to react with the alum and sodium aluminate to give an aqueous first reactor effluent stream having a fluoride concentration less than the fluoride concentration of the aqueous feed stream;
   b. directing the aqueous first reactor effluent stream into a clarifier to give a clarified stream;
   c. directing the clarified stream into a second reactor to give a second reactor aqueous feed; and
   d. adding alum and sodium aluminate to the second reactor and allowing the alum and sodium aluminate to contact the second reactor aqueous feed for a period of time sufficient to give a second reactor aqueous product stream having a fluoride concentration less than the fluoride concentration of the first reactor effluent stream.

2. The process of claim 1 wherein the alum and/or sodium aluminate are added to the process in an amount sufficient to maintain the first pH of the first reactor and the second reactor within a range of from about 5.5 to about 7.5.

3. The process of claim 1 wherein the second reactor effluent stream is directed into a second clarifier to give a clarified product stream and a partially reacted aluminum containing sludge wherein at least a portion of the partially reacted aluminum containing sludge is directed to the first reactor.

4. The process of claim 1 wherein the second reactor effluent stream contains less than about 10 mg/L fluoride.

5. The process of claim 1 wherein the process is operated continuously.

6. The process of claim 1 wherein the aluminum to fluoride weight ratio of the first reactor admixture ranges from about to about 1 to about 9.

7. The process of claim 1 wherein the aluminum to fluoride weight ratio of the second reaction admixture ranges from about 1.75 to about 12.0.

8. A continuous process for removing fluoride from a fluoride containing aqueous feed comprising the steps of:
   a. admixing the fluoride containing aqueous feed stream with a sludge recycle stream comprising unreacted alum and sodium aluminate in a first reactor to give a first reactor admixture;
   b. allowing the first reactor admixture to remain in the first reactor for a period of time sufficient to allow at least a portion of fluoride to react with the unreacted alum and sodium aluminate to give an aqueous first reactor effluent stream having a fluoride concentration less than the fluoride concentration of the aqueous feed stream;
   c. clarifying the first reactor effluent stream to give a first clarified effluent stream and a sludge product stream;
   d. admixing the clarified effluent stream with fresh alum and fresh sodium aluminate in a second reactor to give a second reactor admixture;

e. allowing the second reactor admixture to remain in the second reactor for a period of time sufficient to give a second reactor effluent stream that has a fluoride concentration less than the fluoride concentration of the first reactor effluent stream;

f. clarifying the second reactor effluent stream to give a clarified aqueous product stream and a sludge recycle stream; and g. directing at least a portion of the sludge recycle stream to the first reactor.

9. The process of claim 8 wherein fresh aluminum is added to the first reactor in the form of fresh alum, fresh sodium aluminate, and mixtures thereof.

10. The process of claim 8 wherein the fresh alum and fresh sodium aluminate are added to the second reactor process in an amount sufficient to maintain the first pH of the first reactor and the second reactor within a range of from about 5.5 to about 7.5.

11. The process of claim 8 wherein the second reactor effluent stream contains less than about 10 mg/L fluoride.

12. The process of claim 8 wherein the process is operated continuously.

13. The process of claim 8 wherein the aluminum to fluoride weight ratio of the first reactor admixture ranges from about to about 1 to about 9.

14. The process of claim 8 wherein the aluminum to fluoride weight ratio of the second reaction admixture ranges from about 1.75 to about 12.0.

* * * * *